(12) United States Patent
Toba Francis et al.

(10) Patent No.: US 8,806,024 B1
(45) Date of Patent: Aug. 12, 2014

(54) BI-DIRECTIONAL SHARING OF A DOCUMENT OBJECT MODEL

(75) Inventors: Brian Alejandro Toba Francis, Kirkland, WA (US); Reymarx Gereda Pico, Bellevue, WA (US); Renee Mauricio Cuevas, Sammamish, WA (US); Christopher Lee Rallo, Seattle, WA (US); Javier Figueroa, Pembroke Pines, FL (US); Alejandro E. Cabrera, San Francisco, CA (US)

(73) Assignee: OMG Holdings, Inc., Seattle, WA (US)

( * ) Notice: Subject to any disclaimer, the term of this patent is extended or adjusted under 35 U.S.C. 154(b) by 44 days.

(21) Appl. No.: 13/231,876

(22) Filed: Sep. 13, 2011

Related U.S. Application Data

(60) Provisional application No. 61/382,854, filed on Sep. 14, 2010.

(51) Int. Cl.
*G06F 15/16* (2006.01)
(52) U.S. Cl.
USPC .......................................................... 709/227
(58) Field of Classification Search
None
See application file for complete search history.

(56) References Cited

U.S. PATENT DOCUMENTS

| | | | |
|---|---|---|---|
| 2002/0138624 A1* | 9/2002 | Esenther | 709/227 |
| 2005/0235220 A1* | 10/2005 | Duperrouzel et al. | 715/788 |
| 2009/0037517 A1* | 2/2009 | Frei | 709/202 |
| 2009/0254971 A1* | 10/2009 | Herz et al. | 726/1 |
| 2010/0306642 A1* | 12/2010 | Lowet et al. | 715/234 |

OTHER PUBLICATIONS

De Ross, Luigi, Co-Browsing Tools: Guide to the Best Online Services, Aug. 24, 2009, p. 7.*
Citrix Online, LLC, "GoToMeeting, Features: Easy-to-use GoToMeeting features make online collaboration a breeze," Aug. 30, 2010, five pages. [Online] [Retrieved Dec. 20, 2011] Retrieved from the Internet <URL:http://web.archive.org/web/20100830184208/http://www.gotomeeting.com/fec/online_collaborationPrint?width=765&height=540>.
Skype Limited, "Why you'll love using Skype," May 28, 2010, five pages. [Online] [Retrieved Dec. 20, 2011] Retrieved from the Internet <URL:http://web.archive.org/web/20100528105424/http://www.skype.com/intl/en/features/?>.

* cited by examiner

*Primary Examiner* — Ario Etienne
*Assistant Examiner* — Clayton R Williams
(74) *Attorney, Agent, or Firm* — Fenwick & West LLP

(57) ABSTRACT

A system and a method are disclosed for bi-directionally sharing DOMS in order to enable a shared internet browsing experience between first and second client computing devices. The client computing devices share the DOMs of the webpages each is currently viewing via a central server. In this manner, the webpage being viewed at the first client computing device is rendered at the second client computing device and the webpage being viewed at the second client computing device is rendered at the first client computing device.

32 Claims, 10 Drawing Sheets

BI-DIRECTIONAL SHARING OF A DOCUMENT OBJECT MODEL

CROSS REFERENCE TO RELATED APPLICATIONS

This application claims the benefit of U.S. Provisional Application No. 61/382,854, filed Sep. 14, 2010, which is incorporated by reference in its entirety.

BACKGROUND

1. Field of Art

The disclosure generally relates to the field of improved user interfaces and techniques for browsing networked data, more specifically a manner for a plurality of users to collaboratively access data.

2. Description of the Related Art

Since the release of the first web browser years ago, the use of the internet for entertainment, communication, study, retail, and much more, has boomed. While the inherent nature of the internet is to connect many computers, internet browsing has remained largely a solitary experience. Despite the fact that many of the activities that are now performed on-line (e.g., shopping) have traditionally been social experiences, the social aspects of these activities have not been well developed in the digital world.

When purchasing items from a traditional "brick and mortar" store, many people choose to shop in a group. In deciding whether to purchase a particular item, a shopper often obtains opinions and suggestions regarding alternative items from others people while in the store itself. In contrast, on-line shoppers currently have to interact with others separately from the web store they are viewing, for example via instant messenger, via email, or by verbally reciting web addresses and item descriptions over the phone.

In the above example, as well as other scenarios, it would be advantageous for two or more users to be able to see what the others in their group are viewing on-line. It would also be advantageous to provide tools with which the users can highlight portions of interest of the web page they are viewing, and otherwise communicate information directly from within their web browser.

Existing products such as GOTOMEETING® and SKYPE® allow for one user to share their screen with another. However, this sharing is significantly limited. While a first user is sharing their screen with a second user, the second user may not also share their screen with the first. The sharing is also done via image capture protocols, thereby preventing the second user from interacting with the web page being viewed by the first user.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

An example embodiment described herein includes a system, method and computer readable storage medium for enabling two users to collaboratively browse websites using web browsers running on geographically remote clients. The system is configured such that the remote clients share the Document Object Models (DOMs) of webpages the users are viewing via a central server located in the cloud. In this manner each user can see what the other is currently looking at. The system is further configured to provide tools to aid communication and improve the shared browsing experience.

Computing Machine Architecture

Figure 1:
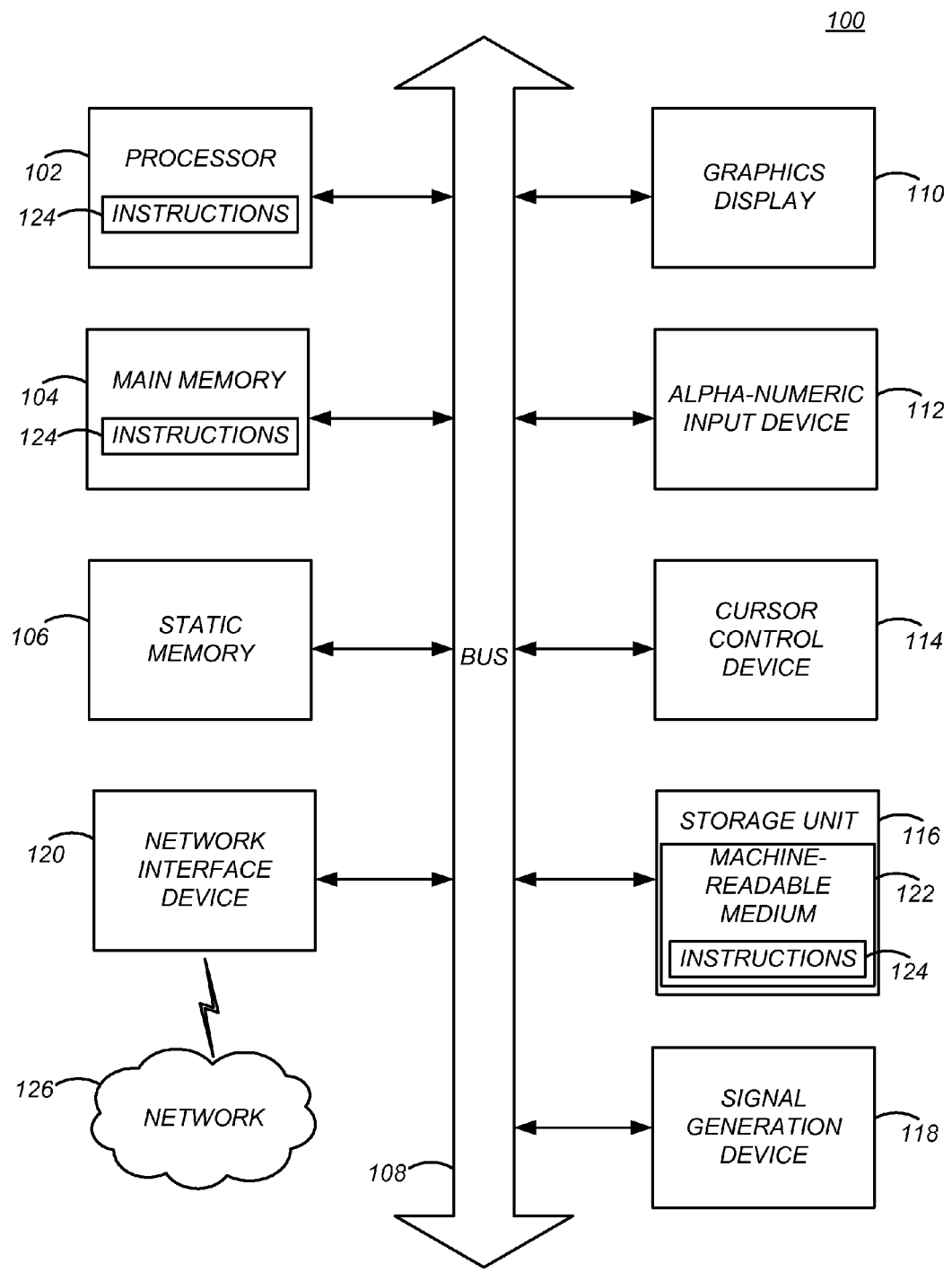
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes data repositories in the form of solid-state memories, optical media, and magnetic media.

System Configuration Overview

Figure 2:
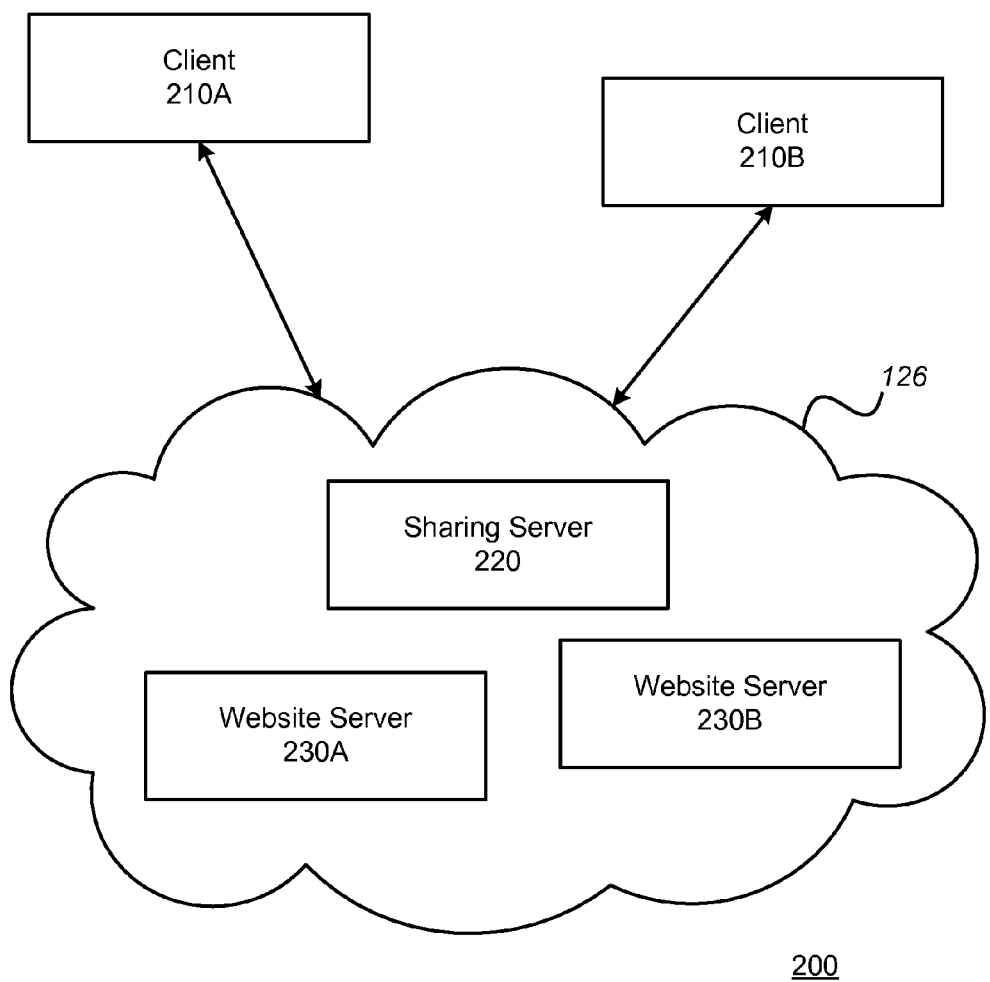
FIG. 2 is a high level diagram of one embodiment illustrating a networked environment in which two browsers are engaged in a collaborative browsing session.

FIG. 2 is a high level illustration of one example embodiment of a networked system 200. The network system 200 includes two or more client computers 210A, 210B, etc. (generally client 219), the network 126, a sharing server computer 220, and one or more website server computer 230A, 230B, etc. (generally website server 230). The clients 210 communicate with the servers 220, 230 through the network 126. The computers can be configured similar to the machine illustrated and described by example in FIG. 1.

Operationally, in one embodiment a first user is viewing a website hosted on a web server 230A using a web browser on a client computing device 210A. Simultaneously, a second user is browsing a different website hosted on web server 230B using a web browser on another client 210B. Both clients 210A, 210B in this example are communicatively connected to the website servers 230A, 230B and a sharing server 220 through a network 126. In a specific preferred embodiment the network 126 is the internet, but it may also be an intranet, LAN, WAN, or any other type of computing network that allows communicative coupling of clients 210A, 210B.

The sharing server 230 enables each user to see the web page being viewed by the other user on their respective computer systems with substantially real-time updates. A number of exemplary embodiments further describing this follows. Although only two clients 210 and web servers 230 are shown, in practice there are many (e.g., thousands or millions of) such clients and web servers communicatively coupled with network 126. Although the embodiments described herein primarily refer to shared browsing sessions with two users, one of skill in the art will recognize that embodiments of the system and method can be used to enable shared browsing sessions with any number of users.

Figure 3:
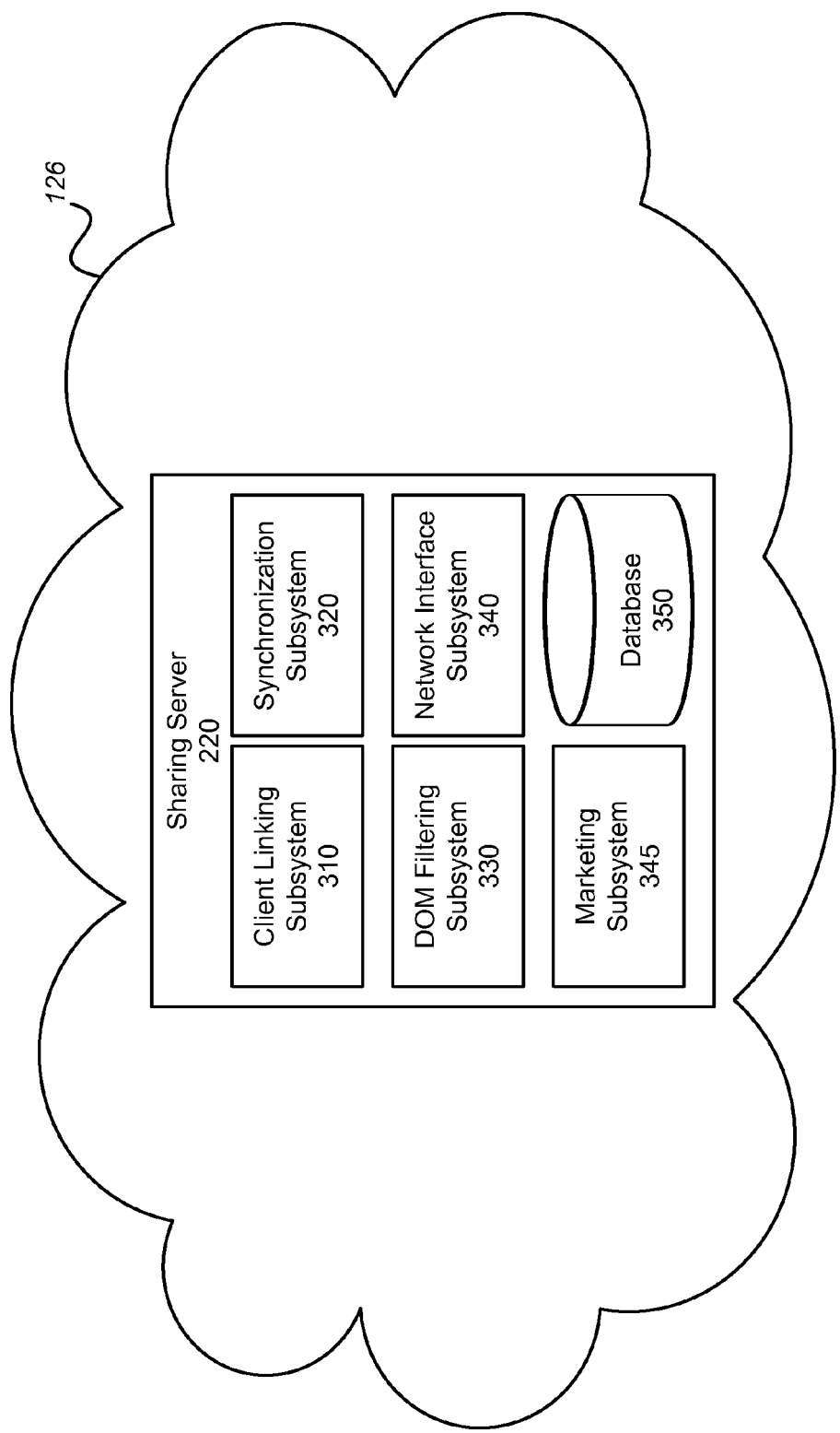
FIG. 3 illustrates a logical view of a sharing server in one embodiment.

FIG. 3 illustrates a functional view of a sharing server 220 used to enable shared browsing sessions. Sharing server 220 comprises a client linking subsystem 310, a synchronization subsystem 320, a DOM filtering subsystem 330, a network interface subsystem 340, a marketing subsystem 345 and a database 350. In the embodiment described, the sharing server 220 is presented as a single computing device (or computer), but it should be recognized that in other embodiments, the function of sharing server 220 could be performed by two or more computing devices communicatively connected by the network 126.

The client linking subsystem 310 creates a record in database 350 responsive to the sharing server 220 receiving a request to initiate a shared browsing session between client 210A and client 210B. The record identifies the network addresses of both clients and the status of the shared browsing session linking them. This is described further below with reference to FIGS. 4 and 5. In one embodiment, these details are automatically deleted from the database 350 on termination of the shared browsing session. This advantageously reduces the size of the database 350 and contributes to the protection of the privacy of users.

When a shared browsing session is active, the synchronization subsystem 320 ensures that the display of shared web pages is updated substantially in real-time at all clients 210. The DOM filtering system 330 filters DOMs received from network 126 in order to improve security and efficiency. The marketing subsystem 345 delivers targeted advertisements and/or promotional offers responsive to observed user behavioral trends for both users in a shared browsing session. These features are described in further detail below.

Initiating a Shared Browsing Session

Figure 4:
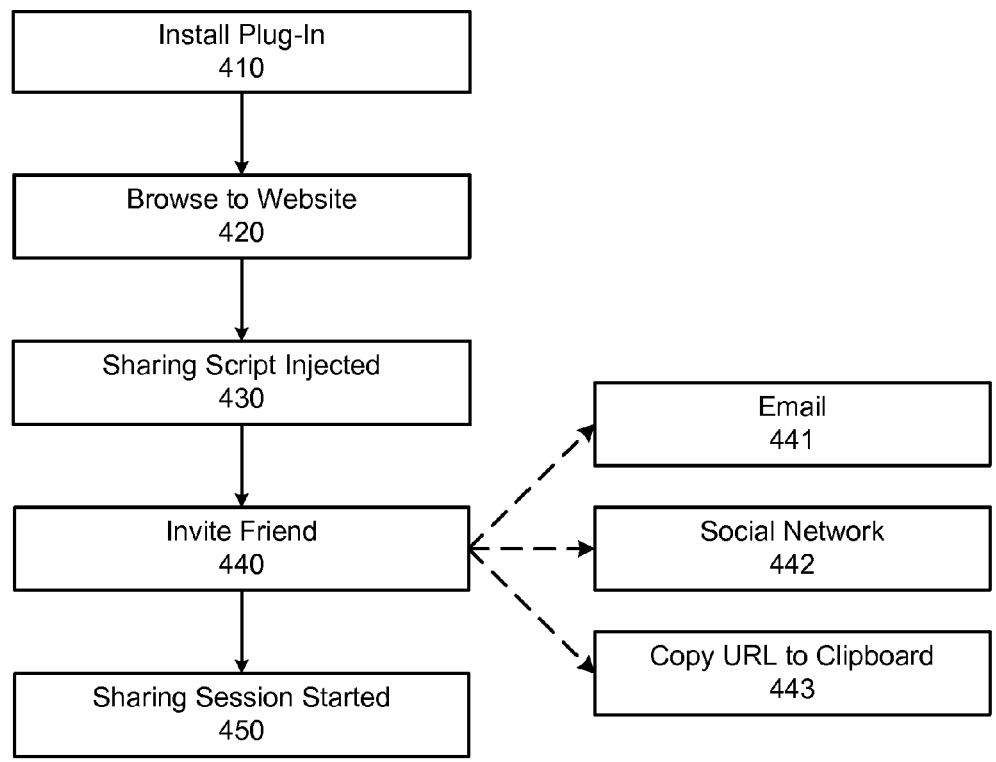
FIG. 4 is flowchart illustrating the process, in one embodiment, of initiating a shared browsing session from the perspective of a client from which a share request is sent.

FIG. 4 is a flowchart illustrating an example process by which a shared browsing session is initiated. A first user is browsing the internet using client 210A with a browser that has already had a shared browsing plug-in installed 410, which causes a sharing toolbar to be displayed in the browser window. The first user browses to a website that they wish to share 420 and presses an "initiate share session" button on the toolbar. A request to initiate a shared browsing session is automatically sent to a sharing server 220 and processed by the client linking subsystem 310. A new sharing session entry is created in database 350, including an indication that client 210A is part of the sharing session.

A share script is injected into the DOM of the web page being viewed 430. The share script includes instructions for sending the DOM to the sharing server 220 as well as providing user tools to improve the shared browsing experience. The first user is then prompted to select a second user to invite to the sharing session 440. There are a number of ways the invitation can be sent. An email address can be entered and an email message with the invitation will then be automatically sent 441. Alternatively, the first user can select a friend from a list of contacts from a social network, such as FACEBOOK™, and the invitation is delivered via the social network 442. If the first user wishes to deliver the invitation in another manner (such as via an instant messenger service), the invitation can be copied to the clipboard to be pasted into other applications 443.

Once the invitation has been accepted by the second user at a second client 210B, a notification of acceptance is automatically sent to the sharing server 220. On receiving the notification of acceptance by the sharing server 220, the client linking subsystem 310 adds the second client 210B to the database entry corresponding to the shared browsing session. The two clients 210A and 210B are now coupled by sharing server 220 and the shared browsing session has started 450. It is noted that in alternate embodiments, invitations to shared browsing sessions may be delivered in ways other than those described or the sharing server 220 functionality could be implemented entirely by software on clients 210. For example, in one embodiment the first client 210A acts as a sharing server 220. The network address of the second client 210B is stored at the first client 210A. The first client 210A requests a DOM update from the second client 210B at regular intervals (e.g., once every second) and transmits the local DOM directly to the second client 210B whenever it is updated. In a further embodiment, the first client 210A also stores records of all the web pages visited by both of the clients 210A, 210B.

Figure 5:
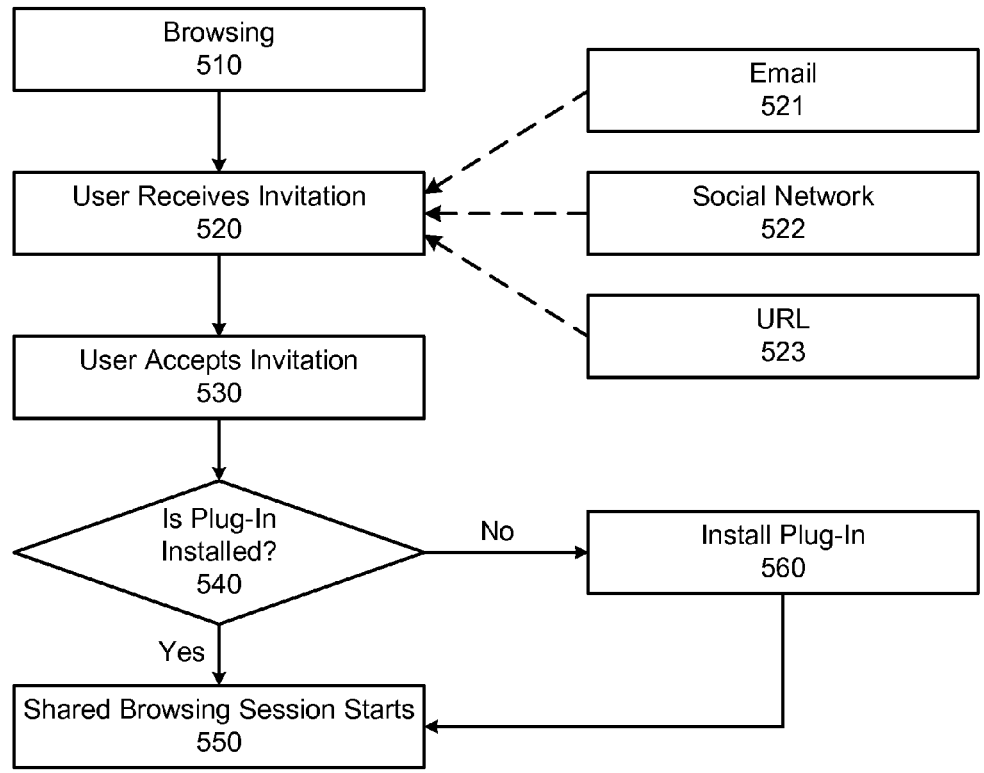
FIG. 5 is a flowchart illustrating the process, in one embodiment, of initiating a shared browsing session from the perspective of a client that receives a share request.

FIG. 5 is a flowchart illustrating the same events described above in relation to FIG. 4 from the perspective of a computing system of the second user receiving the shared browsing request. For the purpose of this explanation it is assumed that the second user is already using a web browser to browse the internet 510. If they are not, the first user must wait for them to open a web browser on a client computing device 210B. In one embodiment, the sharing server 220 automatically notifies the second user that they have been sent a shared browsing request via instant messenger, SMS Text, automated phone call, or any other appropriate method.

Once the second user has received the invitation 520 and accepted it 530 their browser is checked to see if the shared browsing plug-in is already installed 540. If it is, then the shared browsing session starts immediately 550. If it is not, the second user is directed to install the plug-in 560 and the shared browsing session starts on successful installation 550.

In an alternative embodiment, rather than a plug-in being used to inject the share script, a website has the share script included. In such instances, when a web browser of a client 210 lands on a particular web site (or web page) having the share script, the website server 230 transmits to the web browser on the client 220 the script code for use with the web site. In this case, standard browsers without plug-ins can be used by both users.

Enabling a Shared Browsing Session

Figure 6:
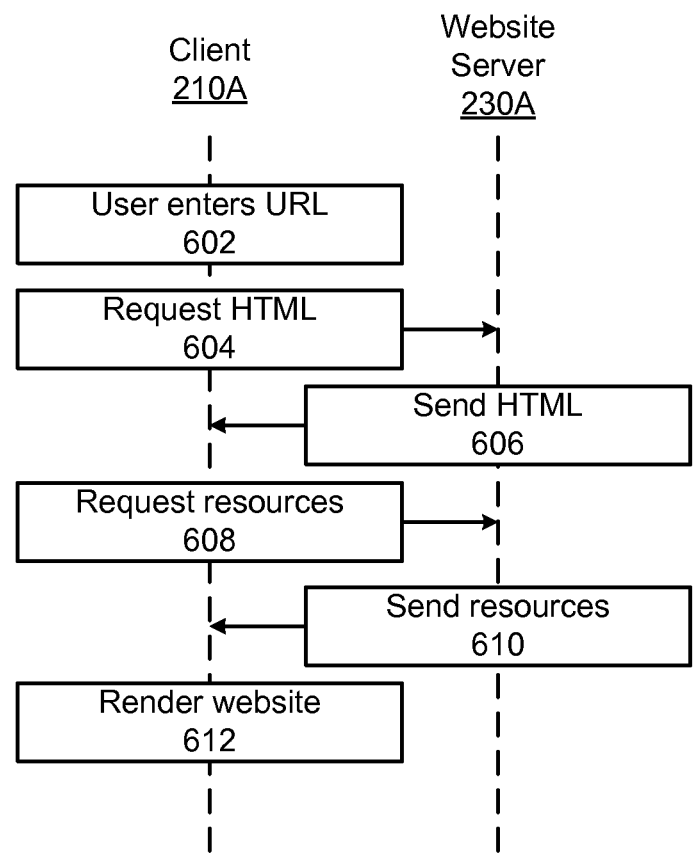
FIG. 6 illustrates the interaction between a client and a website server in a traditional single user browsing session.

FIG. 6 illustrates an example interaction between a client and a website server in a single user browsing session. The left hand line indicates events that occur at a client 210A, being used by a user, and the right hand line indicates events that occur at a website server 230A. These events are presented chronologically with time flowing from the top to the bottom of FIG. 6.

The user at client 210A wishes to visit the website stored on website server 230A. They enter the universal resource locator (URL) for the website (or select an appropriate link or bookmark) 620 in a web browser. Client 210A sends a first request 604 to website server 230A for the HTML of the website. On receiving the first request 604, website server 230A locates the requested HTML and sends it 606 to client 210A. If an error occurs (such as the requested HTML is not found) then an appropriate error code is sent to client 210A instead of the requested webpage code.

Client 210A uses the received HTML to build a DOM and then sends a second request 608 to website server 230A for any resources required by the webpage. Typical resources that will be required include images, style sheets and audio files. Some websites may include embedded objects (such as videos) that are stored on a website server other than website server 230A. In this case client 210A also sends requests for these resources to the website servers indicated in the received HTML. This is not shown in FIG. 6 in order to aid the clarity of the drawing. On receiving the second request 608, website server 230A locates the requested resources and sends those 610 to client 210A. If an error occurs (such as the requested resources not being found) then an appropriate error code is sent to client 210A. On receiving the requested resources, the web browser running on client 210A renders, the DOM in a browser window, thereby displaying the webpage to the user.

Figure 7:
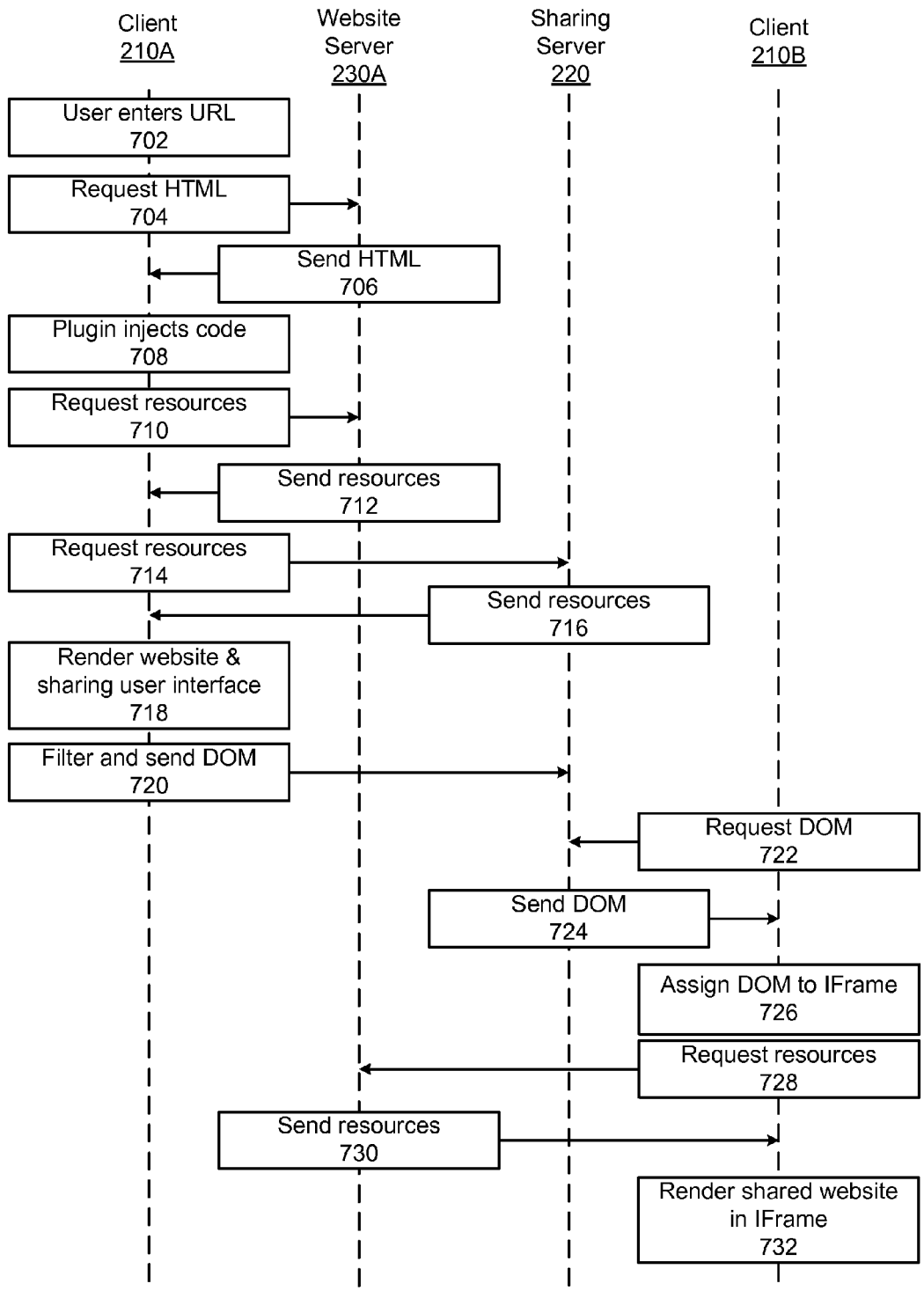
FIG. 7 illustrates the interaction between two clients, a website server and a sharing server in a shared browsing session in one embodiment.

FIG. 7 illustrates the interaction between a first client 210A, a second client 210B, a website server 230A and a sharing server 220 in a shared browsing session in one example embodiment. As with FIG. 6, time flows from top to bottom. The four vertical lines represent, from left to right, events occurring at: the first client 210A, the website server 230A, the sharing server 220 and the second client 210B. A first user using the first client 210A and a second user using the second client 210B have initiated a shared browsing session using web browsers with a shared browsing plug-in installed, for example in the manner illustrated in FIG. 4 and FIG. 5. The first user directs their web browser to a first webpage 702 hosted on the website server 230A, for example by entering a URL, selecting a bookmark or clicking on a link. The second user is browsing a second web page in their web browser (not shown).

The first client 210A sends a request to the website server 230A for HTML content associated with the first website 704. The website server 230A locates the requested HTML content and sends it 706 to the first client 210A, e.g., the first client 210A downloads the HTML content for the first webpage from the website server 230A. The shared browsing plug-in then injects a share script into the downloaded HTML 708, the share script including instructions for displaying a sharing toolbar within the first website and instructions for sending the current DOM to the sharing server 220.

Once the share script has been injected 708, the web browser builds a DOM from the downloaded HTML and injected share script. Client 210A sends a request to the website server 230A for resources related to the first webpage 710. On receiving this request, website server 230A locates the requested resources and sends those 712 to the first client 210A. The first client then sends a request to the sharing server 220 for resources required by the sharing toolbar 714. On receiving this request, the sharing server 220 locates the requested resources and sends those 716 to the first client 210A. The first webpage and the sharing toolbar are now rendered by the first client 210A in a single browser window 718.

Once the first webpage and sharing toolbar have been rendered, the share script reads the DOM and sends it 720 to the sharing server 220. In a specific embodiment, the DOM is serialized to create a JavaScript Object Notation (JSON) object to enable it to be efficiently transmitted to the sharing server 220. In other embodiments, other approaches may be used to serialize the DOM, such as creating an XML representation. For convenience, the term "DOM" shall be used from here on to describe any such representation, whether it is stored as an object in a computing device's memory or a serialized computer readable data representation.

In one example embodiment, the DOM is filtered at client 210A before being sent to the sharing server 220. This filtering includes removing the share script which is not needed for remote browsers to render a reproduction of the first webpage. In one such specific embodiment, the filtering removes any event or script nodes which could contain scripted instructions. This filtering reduces the amount of data that is sent to the sharing server 220, thus saving bandwidth. It also improves security by preventing malicious scripts from being sent from client 210A to the sharing server 220 and/or client 210B.

Once sharing server 220 has received the DOM from the first client 210A, the second client 210B sends the sharing server 220 a request for the DOM 722. Responsive to this request, the sharing server 220 sends the second client 210B the DOM 724. In one specific embodiment the second client 210B requests the DOM responsive to the synchronization subsystem 320 of sharing server 220 notifying the second client 210B that an updated DOM from the first client 210A is available. In another specific embodiment, the second client 210B makes such requests at regular intervals and the sharing server 220 responds by either sending a new/updated DOM 724, or informing the second client 210B that no new/updated DOM is available (not shown).

Once the second client 210B has received a new/updated DOM it assigns it to an IFrame in the browser window in which the second user is viewing the second webpage 726. The second client 210B then sends a request to the website server 230A for the resources relating to the webpage that are referenced in the received DOM 728. The website server 230A locates the requested resources and sends those 730 to the second client 210B. On receiving the requested resources, the second client 210B renders the webpage in the IFrame 732. In this manner the second user can now view the first and second webpages in a single browser window.

Whenever the web browser of the first client 210A makes a change to the local DOM, for example if the user navigates to a new page, scrolls to a new portion of the current page, or uses the sharing toolbar to mark-up the current page (see further details below in discussion of FIG. 10), the share script captures this change and sends the updated DOM to the sharing server 220. Thus, the view of the first webpage rendered at the second client 210B is updated at substantially the same time as the view of the first webpage is updated at the first client 210A.

In the above described embodiment, both clients 210 will be simultaneously acting in the manner described for the first client 210A and the second client 210B. Thus, the first user's web browser (e.g., on the client 210A) displays the first web page with the second web page in an IFrame and the second user's web browser (e.g., on the client 210B) displays the second webpage with the first webpage in an IFrame.

Figure 8:
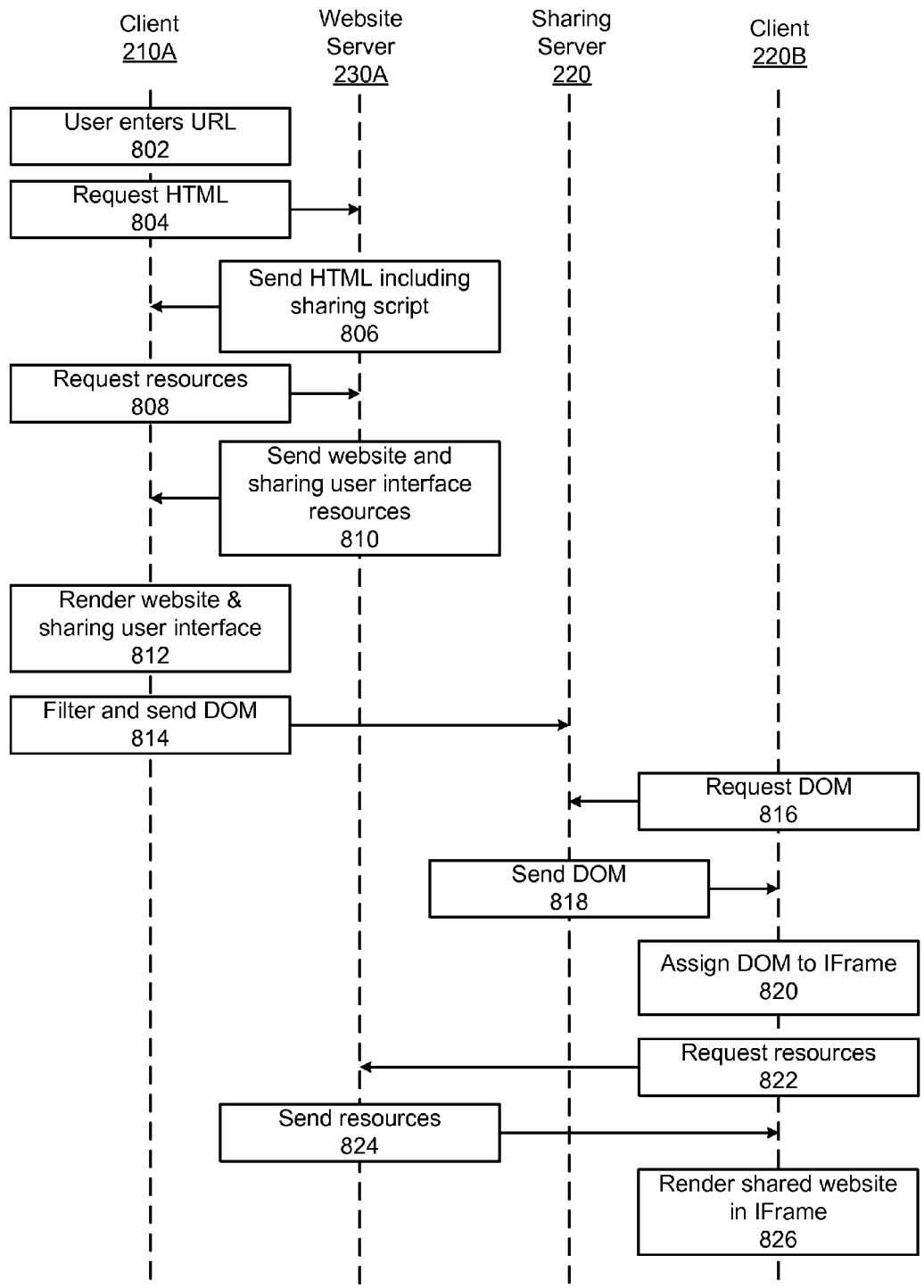
FIG. 8 illustrates the interaction between two clients, a website server and a sharing server in a shared browsing session in another embodiment.

FIG. 8 illustrates the interaction between a first client 210A, a second client 210B, a website server 230A and a sharing server 220 in a shared browsing session in an alternative embodiment to that illustrated in FIG. 7. In this embodiment, the share script is embedded in a first website hosted on the website server 230A. The method described is much the same as that illustrated in FIG. 7 but has the advantages that the web browser used on the first client 210A does not need to have a shared browsing plug-in installed and that less request/send cycles are required, thereby saving bandwidth.

A first user using the web browser on the first client 210A directs it to the first website by entering the URL 802 or another appropriate method. The first client 210A requests HTML associated with the first webpage 804 from the website server 230A. Responsive to this request, the website server 230A sends the HTML content associated with the first web page to the first client 210A, including the embedded share script 806. On receiving the HTML (including the share script), the first client 210A builds a DOM for the first webpage and sends a request to the website server 230A for the resources required to render the webpage and sharing toolbar 808. The website server 230A returns the requested resources responsive to this request 810. On receiving the requested resources, the first client 210A renders the website and the sharing toolbar in a web browser window. Once the first client 210A has rendered the first webpage, the DOM is filtered and sent 814 to the sharing server 220 in the manner described in reference to FIG. 7 above.

The second client 210B sends a request to the sharing server 220 for the DOM 816. The sharing server 220 sends the DOM to the second client 220B responsive to that request 818. On receiving the DOM, the second client 210B assigns it to an IFrame in a browser window in which the second user is viewing a second website. The second client 220B then requests the resources referenced in the DOM 822 from the website server 230A. The website server 230A returns the requested resources responsive to this request 824 and then the second client renders the first website in the IFrame 826.

Exemplary Usage

Figure 9:
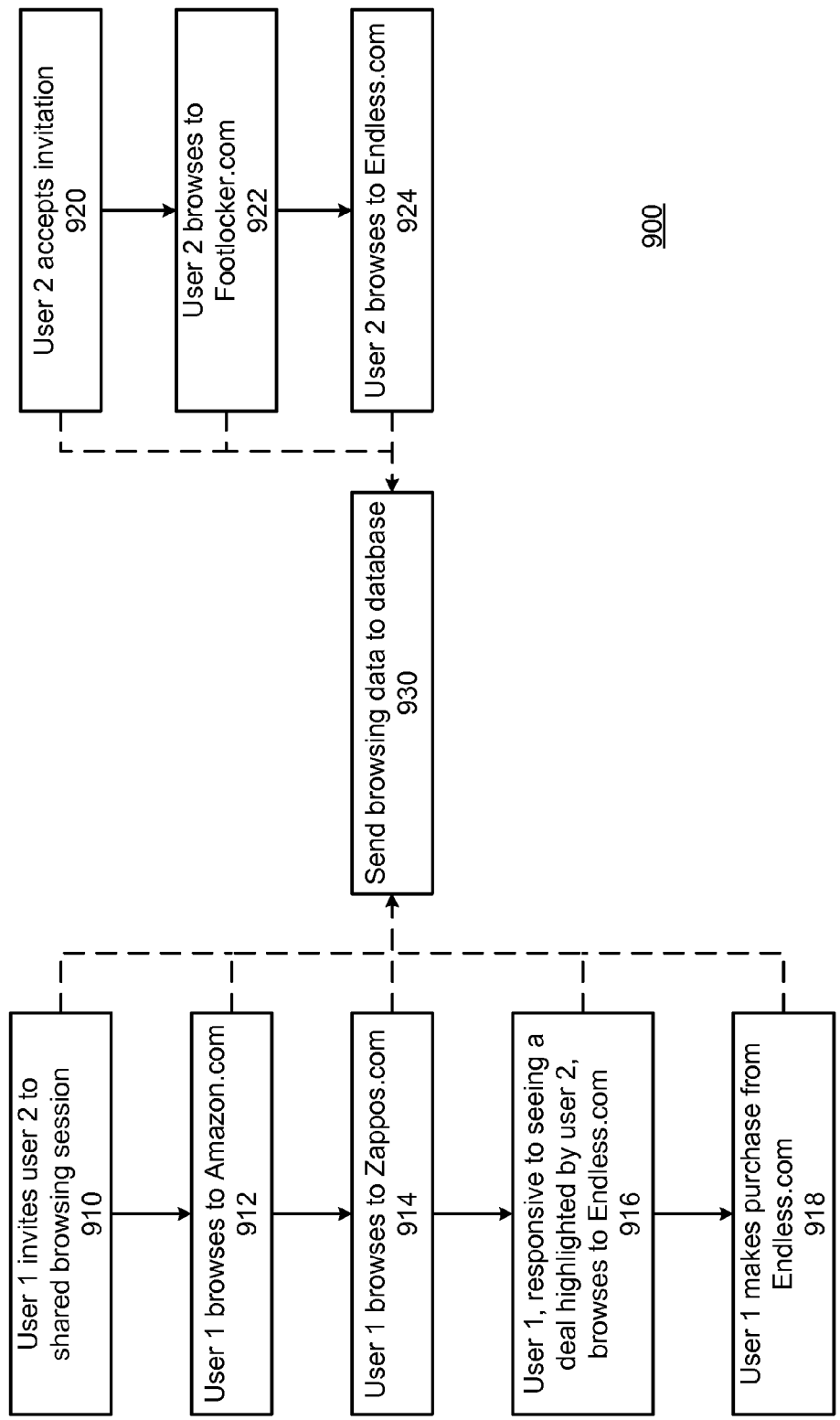
FIG. 9 illustrates a typical use of a shared browsing session in one embodiment.

FIG. 9 illustrates an example operational use of a shared browsing session 900. In this example, a first user is browsing the internet to look for shoes to purchase using a client computer 210A. The first user, wishing to share the experience with a second user, invites 910 them to a shared browsing session. The second user is already browsing the internet on their computer 210B and immediately accepts 920 the invitation from the first user. The first user then browses 912 to a website, e.g., Amazon.com, and the second user browses 922 to another website, e.g., Footlocker.com. Both can see what the other is currently looking at in the IFrame that the browser plug-in has embedded in their respective browser windows.

Not being satisfied with the prices on the first two websites, the first user browses 914 to yet another website, e.g., Zappos.com, and the second user also browses 924 to another website, e.g., Endless.com. The second user sees what they believe to be a good deal on Endless.com and uses a built in highlight tool to indicate this to the first user who agrees that the highlighted deal is a good one and directs 916 their web browser to Endless.com. The first user then purchases 918 the shoes that the second user indicated from Endless.com and the shared browsing session 900 is concluded.

At each step in the above described shared browsing session, data regarding what each user is looking at is sent 930 to a central database. This database stores the browsing history of both users with reference to a single entity, the shared browsing session. This provides several advantages over systems that can only track the browsing history of a single user. If only the browsing history of user 1 had been tracked, then the system would be entirely unaware that Footlocker.com had been considered as a potential vendor. A more accurate picture can of the relative attractiveness to potential customers of different vendor web sites when viewed as part of the same session can therefore be built. This information can additionally be used to target advertisements that recommend related vendors with greater accuracy than the prior art systems. Further, the shared browsing session provides unique opportunities to make marketing offers to both users. For example, in an attempt to capture the sale, Zappos.com could arrange to issue offers to both users in shared browsing sessions whereby each receives a discount if both make a purchase. Not only does this have the potential to achieve the sale which would otherwise have gone to Endless.com, but it can generate an entirely new sale (to the second user) who was not initially intending to make a purchase at all.

Figure 10:
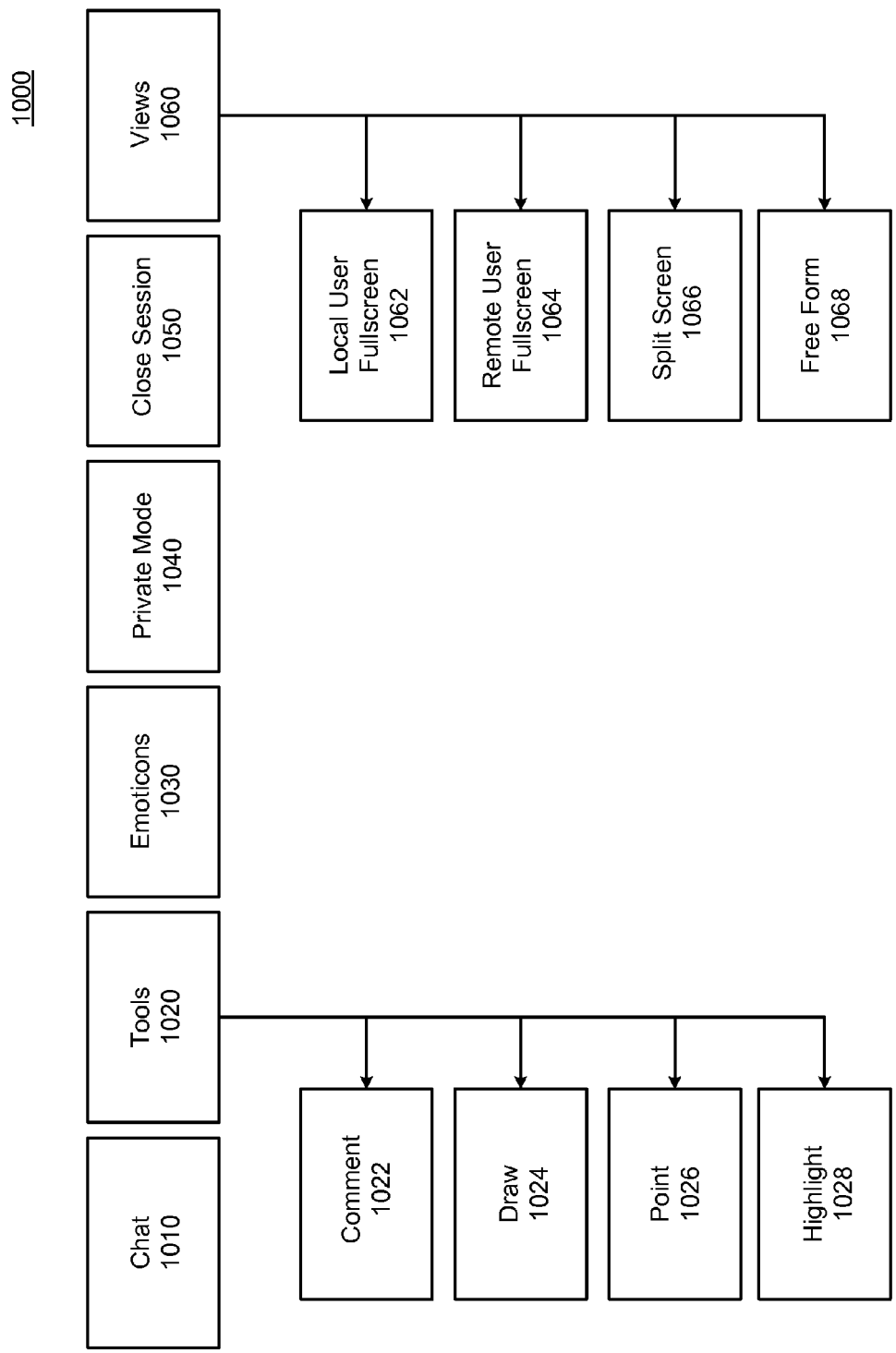
FIG. 10 illustrates a sharing toolbar user interface in one embodiment.

FIG. 10 illustrates an example embodiment of a logical representation of a sharing toolbar user interface 1000. The toolbar 1000 provides an integrated instant messenger chat function 1010 with which the users engaged in a shared browsing experience can chat about the pages they are viewing, or anything else should they wish to.

A set of tools 1020 are provided for marking up the webpage being viewed. In one embodiment a user only marks up the page they are locally browsing, in another they may also markup pages being viewed by the other user in the shared browsing session. As presented, markup tools 1020 include a comment function 1022 with which a user can add a "sticky note" with a comment, a draw function 1024 with which the user can draw freehand, a point function 1026 with which the user can indicate a specific point, and a highlight function 1028 that allows the user to highlight a portion of text.

The toolbar 1000 also provides an emoticon function 1030 that enables a user to attach graphical representations of their general feelings that can be placed on a web page on top of a certain element. In a specific embodiment, emoticons are provided to indicate: I love it, I hate it, I want it, I don't want it, it is too expensive, and it is too cheap.

A control is provided by the toolbar 1000 for a user to toggle "private mode" 1040. When this mode is enabled by a user updates are not sent to the remote user regarding changes in what they are viewing. This enables the user to privately browse websites without the need to close the current shared browsing session using the provided control 1050 and initiate a new one at a later time.

Finally, the toolbar 1000 provides controls for changing the way the shared browsing session is viewed 1060. In the presented embodiment, a user can choose between viewing the webpage they browsed to themselves full screen 1062, the webpage the other user us currently viewing full screen 1064, viewing both pages in a 50/50 split screen mode 1066, or manipulating the size of both views manually in a freeform mode 1068.

One of skill in the art will recognize that many other tools and methods may be provided for manipulating the display of a shared browsing session and enabling effective communication between the users. The precise nature of the tools and methods provided will depend on user preferences, intended use, available technology and many other factors. The inclusion of one specific user interface embodiment should not be taken as limiting to the scope of the disclosed configurations.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example as described in FIGS. 2, 3, and 10. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein, e.g., in FIGS. 4-9, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling two or more users to engage in a shared browsing session where both can observe what the other is looking at, substantially in real time, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for bi-directionally sharing document object models (DOMs) to enable a shared internet browsing experience, that method comprising:
   sending a first request to a first website server for computer readable code corresponding to a first webpage;
   receiving the computer readable code from the first website server;
   generating a first DOM using the computer readable code, the first DOM including instructions for rendering the first webpage and a share script, the share script including instructions for rendering a toolbar in conjunction with the first webpage, the toolbar comprising user controls including a first control for initiating sharing of the first webpage and a second control for adding an annotation to the first webpage;
   rendering the first DOM in a first frame of a web browser, wherein the rendering includes obtaining resources from the first website server and a central server;
   filtering the first DOM to remove unnecessary data, the unnecessary data including the share script;
   sending the first DOM to the central server;
   receiving, from the central server, a second DOM corresponding to a second webpage being viewed on a remote computer, the second webpage hosted at a second website server, the second website server different than the central server; and
   rendering the second DOM in a second frame of the web browser, wherein the rendering includes obtaining resources from the second website server.

2. The method of claim 1, further comprising sending, to the central server and responsive to user-selection of the first control, a second request to initiate a shared browsing session with the remote computer.

3. The method of claim 1, further comprising:
   receiving, from the central server, a third request to initiate the shared browsing session with a remote computer, the third request sent from the central server responsive to the central server receiving a second request to initiate the shared browsing session from the remote computer;
   determining whether the share script is available to the web browser;
   providing a prompt to install a browser plug-in, responsive to determining the share script is not available to the web browser; and
   sending, to the central server and the browser plug-in being successfully installed, confirmation that the request to initiate the shared browsing session has been accepted.

4. A method for bi-directionally sharing document object models (DOMs) to enable a shared internet browsing experience, that method comprising:
   downloading computer readable code that corresponds to a first webpage from a first website server;
   generating a first DOM using the computer readable code, the first DOM including instructions for rendering the first webpage and a share script, the share script including instructions for rendering a toolbar in conjunction with the first webpage, the toolbar comprising user controls including a first control for initiating sharing of the first webpage and a second control for adding an annotation to the first webpage;

rendering, using the first DOM, the first webpage in a first frame of a web browser;

rendering the toolbar in conjunction with the first webpage;

receiving, from a central server, a second DOM corresponding to a second webpage being viewed on a remote client computing device, the second webpage hosted at a second website server, the second website server different than the central server;

rendering, using the second DOM, the second webpage in a second frame of the web browser such that the first webpage, the second webpage, and the toolbar can be simultaneously viewed;

filtering the first DOM to remove data not required to render the first webpage, the data removed including the share script; and sending the first DOM to the central server to be provided to the remote client computing device.

5. The method of claim 4, wherein the share script is provided by the first website server as part of the computer readable code that corresponds to the first webpage.

6. The method of claim 4, wherein the share script is inserted into the first DOM by a browser plug-in.

7. The method of claim 4, wherein rendering the first DOM includes obtaining resources from the first website server and the central server.

8. The method of claim 4, further comprising:
updating the first DOM responsive to user-selection of the second control, the updating comprising adding, to the first DOM, instructions to render an annotation in conjunction with the first webpage; and
sending the updated first DOM to the central server to be provided to the remote client computing device such that annotation can be rendered in conjunction with the first webpage at the remote client computing device.

9. The method of claim 4, wherein rendering the second DOM includes obtaining resources from the second website server.

10. The method of claim 4, wherein the second frame is an IFrame.

11. The method of claim 4, further comprising sending, to the central server, a request to initiate a shared browsing session with the remote client computing device.

12. The method of claim 4, further comprising:
receiving, from the central server, a request to initiate a shared browsing session with the remote client computing device; and
sending, to the central server, confirmation that the request to initiate the shared browsing session has been accepted.

13. The method of claim 12, further comprising:
determining whether the share script is available to the web browser;
providing a prompt to install a shared browsing plug-in, responsive to determining that the share script is not available to the web browser.

14. A method for bi-directionally sharing document object models (DOMs) to enable a shared internet browsing experience, that method comprising:
receiving, at a central server, a first DOM from a first user's computing device, the first DOM corresponding to a first webpage hosted at a first webserver and displayed at the first user's computing device;

receiving, at the central server, a second DOM from a second user's computing device, the second DOM corresponding to a second webpage hosted at a second webserver and displayed at the second user's computing device;

sending, by the central server, the first DOM to the second user's computing device and the second DOM to the first user's computing device, thereby enabling simultaneous display of the first and second webpages at both the first and second user's computing devices;

storing, at the central server, a single database record describing a shared browsing history of the first and second users, the database record including identifiers of: the first client computing device, the second client computing device, the first webpage, and the second webpage; and providing, to both the first user's and the second user's computing devices, information for marketing purposes based on the shared browsing history.

15. The method of claim 14, further comprising filtering the first DOM to remove data not needed to render the first DOM at the second user's computing device.

16. The method of claim 15, wherein the data includes a script node.

17. The method of claim 14, further comprising:
receiving a first request from the first user's computing device to initiate the shared browsing session with the second user's computing device;
sending a first invitation to the second user's computing device to initiate the shared browsing session with the first user's computing device; and
receiving authorization from the second user's computing device to initiate the shared browsing session with the first user's computing device.

18. The method of claim 17, further comprising:
receiving a second request to add a third user's computing device to the shared browsing session;
sending a second invitation to the third user's computing device to join the shared browsing session with the first user's computing device and the second user's computing device;
receiving authorization from the third user's computing device to join the shared browsing session;
sending the first DOM and the second DOM to the third user's computing device;
receiving a third DOM from the third user's computing device, the third DOM corresponding to a third webpage displayed at the third user's computing device; and
sending the third DOM to the first user's computing device and the second user's computing device, thereby enabling simultaneous display of the first, second, and third webpages at both the first and second user's computing devices.

19. The method of claim 18, further comprising adding, to the database record, identifiers of: the third user's computing device and the third webpage.

20. The method of claim 14, wherein providing the information includes delivering a marketing message to the first user's computing device based on the second webpage.

21. The method of claim 14, wherein providing the information includes delivering a marketing message to the first and second client computing devices, the marketing message selected from a plurality of possible messages responsive to the database record.

22. The method of claim 21, wherein the marketing message comprises offering a discount if a first purchase is made from a specific website via the first client computing device and a second purchase is made from the specific website via the second client computing device.

23. A system for managing a shared browsing session that uses bi-directional sharing of document object models (DOMs), comprising:
- a processor; and
- a memory coupled to the processor, the memory storing instructions for:
  - a client linking subsystem, configured to cause the processor to initiate a shared browsing session between a first client computing device that is displaying a first webpage and a second client computing device that is displaying a second webpage, the shared browsing session being initiated responsive to receiving a request to initiate the shared browsing session from the first client computing device;
  - a synchronization subsystem, communicatively coupled to the client linking subsystem, configured to receive a first DOM from the first client computing device and send it to the second client computing device and receive a second DOM from the second client computing device and send it to the first client computing device, the first DOM including instructions for rendering the first webpage and a share script, the share script including instructions for rendering a toolbar in conjunction with the first webpage, the toolbar comprising user controls including a first control for initiating sharing of the first webpage and a second control for adding an annotation to the first webpage, and the second DOM including instructions to render a second webpage; and
  - a DOM filtering subsystem, communicatively coupled to the synchronization subsystem, configured to filter the first DOM to remove the share script prior to sending the first DOM to the second client computing device, thereby enabling simultaneous display of the first and second webpages at both the first and second client computing devices.

24. The system of claim 23, wherein the DOM filtering subsystem is further configured to filter the second DOM, prior to sending the second DOM to the first client computing device, to remove data not needed to render the second DOM at the first client computing device.

25. The system of claim 23, further comprising a database, wherein the synchronization subsystem is further configured to store, in the database, a single database record including identifiers of: the first client computing device, the second client computing device, the first webpage, and the second webpage.

26. The system of claim 25, further comprising a marketing subsystem, communicatively coupled to the database, configured to deliver a marketing message to the first and second client computing devices, responsive to the database record.

27. The system of claim 26, wherein the marketing message comprises offering a discount if a first purchase is made from a specific website via the first client computing device and a second purchase is made from the specific website via the second client computing device.

28. A non-transitory computer readable medium configured to store instructions, the instructions when executed by a processor cause the processor to:
- receive, at a central server, a first DOM from a first user's computing device, the first DOM corresponding to a first webpage hosted at a first webserver and displayed at the first user's computing device;
- receive, at the central server, a second DOM from a second user's computing device, the second DOM corresponding to a second webpage hosted at a second webserver and displayed at the second user's computing device; and
- send, from the central server, the first DOM to the second user's computing device and the second DOM to the first user's computing device, thereby enabling simultaneous display of the first and second webpages at both the first and second user's computing devices;
- store, at the central server, a single database record describing a shared browsing history of the first and second users, the database record including identifiers of: the first client computing device, the second client computing device, the first webpage, and the second webpage; and
- provide, to the first user's computing device, information for marketing purposes based on the shared browsing history.

29. The computer readable medium of claim 28, further comprising instructions that cause the processor to filter the first DOM to remove data not needed to render the first DOM at the second user's computing device, wherein the data includes a script node.

30. The computer readable medium of claim 28, wherein the instructions that cause the processor to provide the information for presentation include instructions to deliver a marketing message to the first user's computing device based on the second webpage.

31. The computer readable medium of claim 28, wherein the instructions that cause the processor to provide the information include instructions to deliver a marketing message to the first and second user's computing devices, the marketing message selected from a plurality of possible messages responsive to the database record.

32. The computer readable medium of claim 31, wherein the marketing message comprises offering a discount if a first purchase is made from a specific website via the first user's computing device and a second purchase is made from the specific website via the second user's computing device.

* * * * *